United States Patent
Long et al.

(10) Patent No.: US 10,451,178 B2
(45) Date of Patent: Oct. 22, 2019

(54) ENGINE-OFF AUXILIARY HYDRAULIC PRESSURIZATION SYSTEM AND METHOD FOR A TRANSMISSION

(71) Applicant: Allison Transmission, Inc., Indianapolis, IN (US)

(72) Inventors: Charles F. Long, Pittsboro, IN (US); Phillip McCauley, Zionsville, IN (US); Charles Taylor, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 819 days.

(21) Appl. No.: 14/961,281

(22) Filed: Dec. 7, 2015

(65) Prior Publication Data

US 2016/0084372 A1 Mar. 24, 2016

Related U.S. Application Data

(62) Division of application No. 14/067,489, filed on Oct. 30, 2013, now Pat. No. 9,206,896.

(Continued)

(51) Int. Cl.
*F16H 61/00* (2006.01)
*F16H 59/68* (2006.01)
*F16H 59/44* (2006.01)

(52) U.S. Cl.
CPC ......... *F16H 61/0031* (2013.01); *F16H 59/44* (2013.01); *F16H 59/68* (2013.01);
(Continued)

(58) Field of Classification Search
CPC .... F16H 59/44; F16H 59/68; F16H 2059/683; F16H 61/0021; F16H 61/0025; F16H 61/0031
See application file for complete search history.

(56) References Cited

U.S. PATENT DOCUMENTS

| 6,390,947 B1 | 5/2002 | Aoki et al. |
| 6,401,458 B2 | 6/2002 | Jacobson |

(Continued)

FOREIGN PATENT DOCUMENTS

| CN | 101038032 A | 9/2007 |
| CN | 101487530 A | 7/2009 |

(Continued)

OTHER PUBLICATIONS

Second Examiner's Report from the Australian Government for Application No. 2013337957, dated May 29, 2017, 4 pages.

(Continued)

*Primary Examiner* — David R Morris
(74) *Attorney, Agent, or Firm* — Barnes & Thornburg LLP

(57) ABSTRACT

An auxiliary hydraulic pressurization system for use with a vehicle including a transmission having a hydraulic reservoir, a hydraulic circuit, and a main pump may include an auxiliary pump and a controller. The auxiliary pump has a low side adapted to be coupled to the hydraulic reservoir and a high side adapted to be coupled to the hydraulic circuit. The controller is electrically connectable to the auxiliary pump and is configured to turn on the auxiliary pump in response to receipt of a signal indicating that the vehicle is in a stop condition to maintain hydraulic pressurization of the hydraulic circuit of the transmission when the vehicle is in the stop condition.

4 Claims, 4 Drawing Sheets

Related U.S. Application Data

(60) Provisional application No. 61/720,673, filed on Oct. 31, 2012.

(52) U.S. Cl.
CPC ... *F16H 61/0021* (2013.01); *F16H 2059/683* (2013.01); *F16H 2312/14* (2013.01); *Y10T 74/20024* (2015.01)

(56) References Cited

U.S. PATENT DOCUMENTS

| | | | | |
|---|---|---|---|---|
| 6,805,647 | B2* | 10/2004 | Silveri | B60K 6/48 475/122 |
| 6,913,558 | B2 | 7/2005 | Mori et al. | |
| 7,137,924 | B2 | 11/2006 | Ito et al. | |
| 7,465,250 | B2* | 12/2008 | Tamai | B60K 6/485 477/3 |
| 7,481,053 | B2* | 1/2009 | Kitano | B60K 6/48 60/329 |
| 7,740,119 | B2* | 6/2010 | Staudinger | F16H 57/04 192/113.34 |
| 7,748,353 | B2 | 7/2010 | Russell et al. | |
| 7,779,958 | B2* | 8/2010 | Kitano | B60K 6/48 180/338 |
| 8,057,355 | B2* | 11/2011 | Tryon | F16H 61/0031 180/65.275 |
| 8,062,171 | B2 | 11/2011 | Soliman | |
| 8,187,147 | B2* | 5/2012 | Tryon | F16H 61/0031 477/3 |
| 8,403,646 | B2* | 3/2013 | Yoshinami | F04C 2/102 417/2 |
| 9,206,896 | B2* | 12/2015 | Long | F16H 61/0031 |
| 9,631,721 | B2* | 4/2017 | Takagi | F16H 61/0031 |
| 9,651,144 | B2* | 5/2017 | Long | F16H 61/0031 |
| 9,683,573 | B2* | 6/2017 | Kagawa | F04B 49/06 |
| 9,726,276 | B2* | 8/2017 | Takahashi | F16H 61/4139 |
| 9,777,828 | B2* | 10/2017 | Yoshitani | F16H 61/0021 |
| 2001/0045093 | A1* | 11/2001 | Jacobson | F01D 1/30 60/602 |
| 2004/0029677 | A1 | 2/2004 | Mori et al. | |
| 2004/0063533 | A1 | 4/2004 | Silveri et al. | |
| 2005/0170929 | A1* | 8/2005 | Ito | B60W 10/06 477/3 |
| 2006/0120876 | A1* | 6/2006 | Kitano | B60K 6/48 417/42 |
| 2006/0120888 | A1* | 6/2006 | Kitano | B60K 6/48 417/321 |
| 2006/0222527 | A1* | 10/2006 | Kurita | F04C 14/26 417/410.1 |
| 2007/0204817 | A1* | 9/2007 | Russell | B60K 6/12 123/90.12 |
| 2007/0213174 | A1 | 9/2007 | Tamai et al. | |
| 2008/0286123 | A1* | 11/2008 | Yoshinami | F04C 2/102 417/118 |
| 2009/0211866 | A1* | 8/2009 | Staudinger | F16H 57/04 192/70.12 |
| 2009/0247353 | A1 | 10/2009 | Tryon et al. | |
| 2009/0247355 | A1* | 10/2009 | Tryon | F16H 61/0031 477/52 |
| 2010/0279816 | A1* | 11/2010 | Soliman | B60K 6/36 477/3 |
| 2014/0116175 | A1 | 5/2014 | Long et al. | |
| 2014/0121921 | A1* | 5/2014 | Long | F16H 61/0031 701/60 |
| 2015/0010408 | A1* | 1/2015 | Kagawa | F04B 49/06 417/43 |
| 2015/0047335 | A1* | 2/2015 | Takahashi | F16H 61/4139 60/428 |
| 2015/0316144 | A1* | 11/2015 | Yoshitani | F16H 61/0021 475/31 |
| 2016/0033032 | A1* | 2/2016 | Takagi | F16H 61/0031 475/117 |

FOREIGN PATENT DOCUMENTS

| | | |
|---|---|---|
| CN | 101544217 A | 9/2009 |
| JP | 2002310272 A | 10/2002 |

OTHER PUBLICATIONS

Second Office Action from the State Intellectual Property Office for the People's Republic of China for Application No. 201380068693.1, dated Feb. 14, 2017, 8 pages.

Office Action and English Translation for Chinese Application No. 201380068693.1, dated Apr. 5, 2016, 25 pages.

European Search Report and Written Opinion for Application No. 13851261.1, dated Jul. 18, 2016, 11 pages.

Search Report and Written Opinion for International Application No. PCT/US2013/067509, dated Feb. 10, 2014, 13 pages.

Examination Report No. 3 from the Australian Government for Application No. 2013337957, dated Oct. 16, 2017, 4 pages.

\* cited by examiner

ENGINE-OFF AUXILIARY HYDRAULIC PRESSURIZATION SYSTEM AND METHOD FOR A TRANSMISSION

CROSS-REFERENCE TO RELATED U.S. PATENT APPLICATION

This application is a divisional application of and claims priority to U.S. application Ser. No. 14/067,489, entitled "ENGINE-OFF AUXILIARY HYDRAULIC PRESSURIZATION SYSTEM AND METHOD FOR A TRANSMISSION," which was filed on Oct. 30, 2013 and which claims priority to U.S. Provisional Patent Application Ser. No. 61/720,673, filed on Oct. 31, 2012. The above applications are incorporated herein by this reference in their entireties.

TECHNICAL FIELD

The present disclosure relates generally to motor vehicle transmissions. More particularly, the present disclosure relates to hydraulic systems included in motor vehicle transmissions.

BACKGROUND

Transmissions are used in vehicles to transfer torque from a drive unit to a vehicle load. For example, many transmissions transfer the torque from a vehicle engine to a vehicle load produced at the interface of the vehicle's wheels when a vehicle is being driven along a road. Typical transmissions include a gear train that is reconfigurable among a number of gear ratios to establish a particular rotational drive ratio between the vehicle engine and the vehicle load.

Some transmissions include hydraulic control systems configured to set the gear ratio of the gear train. Hydraulic control systems may include hydraulic circuits operated by a controller to engage and disengage clutches included in the circuit to set the gear ratio of the gear train. The hydraulic circuit is typically pressurized by a main pump that is mechanically driven by the vehicle engine when the vehicle engine is running. Sometimes, the hydraulic circuit will lose pressure when the main pump is not being driven and the hydraulic circuit may not be able to maintain a selected gear ratio when the vehicle engine is not running.

SUMMARY

According to one aspect of the present disclosure, a vehicle includes a drive unit, a transmission, and an auxiliary hydraulic pressurization system. The drive unit has an on state to provide rotational power and an off state. The transmission is coupled to the drive unit and includes a gear train and a hydraulic control system. The gear train is reconfigurable among a number of gear ratios. The hydraulic control system is configured to set the gear train in one of the plurality of gear ratios. The hydraulic control system includes a hydraulic reservoir, a hydraulic circuit, and a main pump driven by the drive unit when the drive unit is in the on state to pressurize the hydraulic circuit. The auxiliary hydraulic pressurization system is coupled to the hydraulic reservoir and to the hydraulic circuit. The auxiliary hydraulic pressurization system is configured to maintain pressurization of the hydraulic circuit when the drive unit of the vehicle is in the off state.

In some embodiments, the transmission may include a controller coupled to the hydraulic control system and to the auxiliary hydraulic pressurization system. The controller may be configured to control operation of the hydraulic control system. The controller may further be configured to turn on the auxiliary hydraulic pressurization system in response to receipt of a signal indicating that the vehicle is in a stop condition.

In some embodiments, the auxiliary hydraulic pressurization system may include an auxiliary pump and a check valve. The check valve may be coupled to the auxiliary pump and to the hydraulic circuit. The check valve may be arranged to block backflow from the hydraulic circuit through the auxiliary pump.

In some embodiments, the auxiliary hydraulic pressurization system may include a bypass valve coupled to the auxiliary pump and to the hydraulic circuit. The bypass valve may be biased to a closed position and may be configured to open in response to fluid pressure between auxiliary pump and the hydraulic circuit reaching a pressure greater than a threshold bypass pressure.

In some embodiments, the auxiliary hydraulic pressurization system may include a pressure sensor configured to detect fluid pressure between the auxiliary pump and the hydraulic circuit. The auxiliary pump may be configured to stop delivering fluid to the control circuit in response to the pressure sensor detecting fluid pressure above a reference threshold.

In some embodiments, the hydraulic circuit may include a regulator. The regulator may be configured to regulate fluid pressure from the auxiliary hydraulic pressurization system that flows through the rest of the hydraulic circuit.

In some embodiments, the vehicle may include an energy storage unit. The energy storage unit may be coupled to the auxiliary hydraulic pressurization system and may be configured to provide energy to the auxiliary hydraulic pressurization system when the drive unit is in the off state. The energy storage unit may be a battery coupled to the drive unit and configured to charge when the drive unit is in the on state. The energy storage unit may be a pressurized air or oil source.

In some embodiments, the vehicle may include a sensor configured to produce a signal indicating that the vehicle is in the stop condition. The sensor may produce the signal in response to detecting that the vehicle is stopped or in the process of stopping.

According to another aspect of the present disclosure, a transmission unit for use with a vehicle is taught. The transmission unit includes a transmission and an auxiliary hydraulic pressurization system. The transmission includes a gear train reconfigurable among a number of gear ratios and a hydraulic control system configured to set the gear train in one of the plurality of gear ratios. The hydraulic control system includes a hydraulic reservoir, a hydraulic circuit, and a main pump mechanically driven to pressurize the hydraulic circuit. The auxiliary hydraulic pressurization system is coupled to the hydraulic reservoir and to the hydraulic circuit. The auxiliary hydraulic pressurization system is configured to maintain pressurization of the hydraulic circuit when the main pump is not mechanically driven.

In some embodiments, the transmission unit may include a controller electrically coupled to the auxiliary hydraulic pressurization system. The controller may be configured to turn the auxiliary hydraulic pressurization system on in response to receipt of a signal indicating that the vehicle is in a stop condition.

In some embodiments, the transmission unit may include a sensor configured to produce a signal indicating that the vehicle is in the stop condition. The sensor may produce the signal in response to detecting that the vehicle is stopped or in the process of stopping.

In some embodiments, the auxiliary hydraulic pressurization system may include an auxiliary pump and a bypass valve coupled between the auxiliary pump and the hydraulic circuit. The bypass valve may be biased to a closed condition. The bypass valve may be configured to open in response to fluid movement from the auxiliary pump toward the hydraulic circuit at a pressure greater than a threshold bypass pressure.

In some embodiments, the bypass valve may be coupled to the hydraulic reservoir. The bypass valve may establish a bypass path that transmits fluid from the auxiliary pump to the hydraulic reservoir when fluid moves from the auxiliary pump toward the hydraulic circuit at a pressure greater than the threshold bypass pressure.

In some embodiments, the auxiliary hydraulic pressurization system may include a pressure sensor electrically coupled to the controller. The pressure sensor may be configured to detect fluid pressure between the auxiliary pump and the hydraulic circuit. The controller may be configured to turn off the auxiliary pump in response to the pressure sensor detecting fluid pressure above a reference threshold.

In some embodiments, the auxiliary hydraulic pressurization system may include an auxiliary pump. The auxiliary pump may be coupled to the hydraulic reservoir and to the hydraulic circuit.

In some embodiments, the auxiliary hydraulic pressurization system may include a check valve coupled to the auxiliary pump and to the hydraulic circuit. The check valve may be arranged between the auxiliary pump and the hydraulic circuit to block backflow from the hydraulic circuit through the auxiliary pump.

According to another aspect of the present disclosure, a method of controlling a vehicle including a transmission is taught. The method includes receiving a sensor signal indicative of a stop condition of the vehicle; controlling an auxiliary hydraulic pressurization system, in response to the sensor signal, to maintain a hold pressure in a hydraulic control system included in the transmission of the vehicle when the vehicle is in the stop condition; and turning off a drive unit of the vehicle, while the auxiliary hydraulic pressurization system is maintaining the hold pressure, to stop the drive unit from driving a main pump of the transmission that pressurizes the hydraulic control system to a run pressure when the drive unit is in an on state.

In some embodiments, receiving the sensor signal indicative of the stop condition may include receiving a sensor signal indicative that the vehicle is in the process of stopping or has stopped. It is contemplated that receiving the sensor signal indicative of the stop condition may include generating the sensor signal in response to a current velocity of the vehicle falling below a reference threshold.

In some embodiments, the method may also include receiving a user request for vehicle start and turning the drive unit on. Turning the drive unit on may be performed in response to receipt of the user request.

In some embodiments, the method may include powering the auxiliary hydraulic pressurization system using an energy storage unit. It is contemplated that powering the auxiliary hydraulic pressurization system may include powering the auxiliary hydraulic pressurization system using a battery coupled to the drive unit.

In some embodiments, the hold pressure may be less than the run pressure.

In some embodiments, the method may also include receiving a signal indicative of the hold pressure supplied by the auxiliary hydraulic control system from the hydraulic circuit. The method may also include turning on the drive unit if the hold pressure supplied is less than a hold threshold pressure.

According to another aspect of the present disclosure, an auxiliary hydraulic pressurization system for use with a vehicle including a transmission having a hydraulic reservoir, a hydraulic circuit, and a main pump is disclosed. The auxiliary hydraulic pressurization system includes an auxiliary pump and a controller. The auxiliary pump includes a low side adapted to be coupled to the hydraulic reservoir and a high side adapted to be coupled to the hydraulic circuit. The controller is electrically connectable to the auxiliary pump and is configured to turn on the auxiliary pump in response to receipt of a signal indicating that the vehicle is in a stop condition to maintain hydraulic pressurization of the hydraulic circuit of the transmission when the vehicle is in the stop condition.

In some embodiments, the auxiliary hydraulic pressurization system may include a check valve. The check valve may be coupled to the high side of the auxiliary pump and may be adapted to be coupled to the hydraulic circuit. The check valve may be configured to block backflow from the hydraulic circuit through the high side of the auxiliary pump.

In some embodiments, the auxiliary hydraulic pressurization system may include a bypass valve. The bypass valve may be coupled to the high side of the auxiliary pump and may be adapted to be coupled to the hydraulic circuit. The bypass valve may be biased to a closed position and may be configured to open in response to fluid movement from the high side of the auxiliary pump at a pressure greater than a threshold bypass pressure. The threshold bypass pressure may be about 48 psi.

In some embodiments, the auxiliary hydraulic pressurization system may include a pressure sensor coupled to the controller. The pressure sensor may be configured to detect fluid pressure between the high side of the auxiliary pump and the hydraulic circuit. It is contemplated that the controller may be configured to turn the auxiliary pump off in response to the pressure sensor detecting fluid pressure above a high reference threshold and to turn the auxiliary pump on in response to the pressure sensor detecting fluid pressure below a low reference threshold.

DESCRIPTION OF THE DRAWINGS

The systems and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
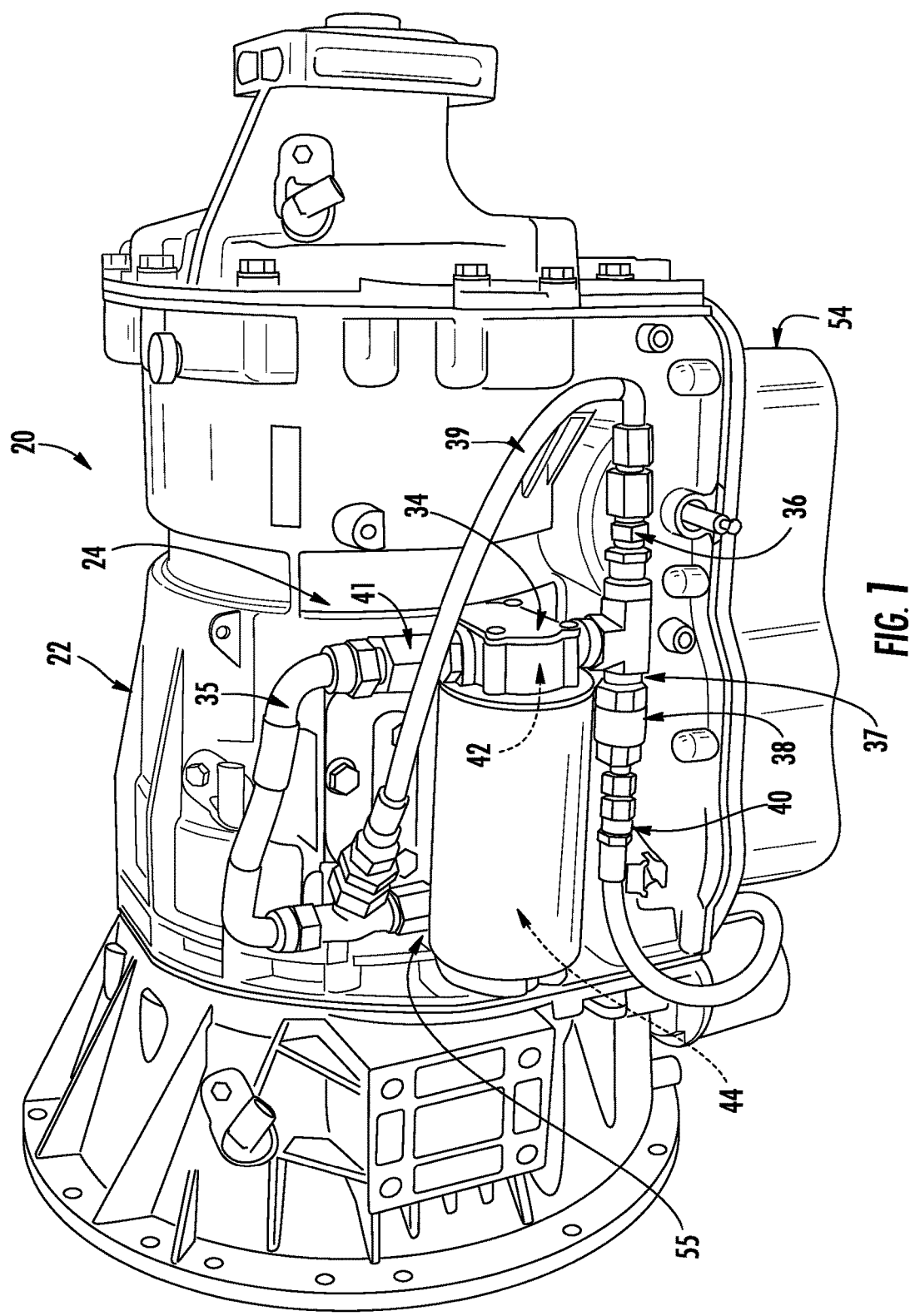
FIG. 1 is a perspective view of a transmission unit including a transmission and an auxiliary hydraulic pressurization system mounted to the transmission.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
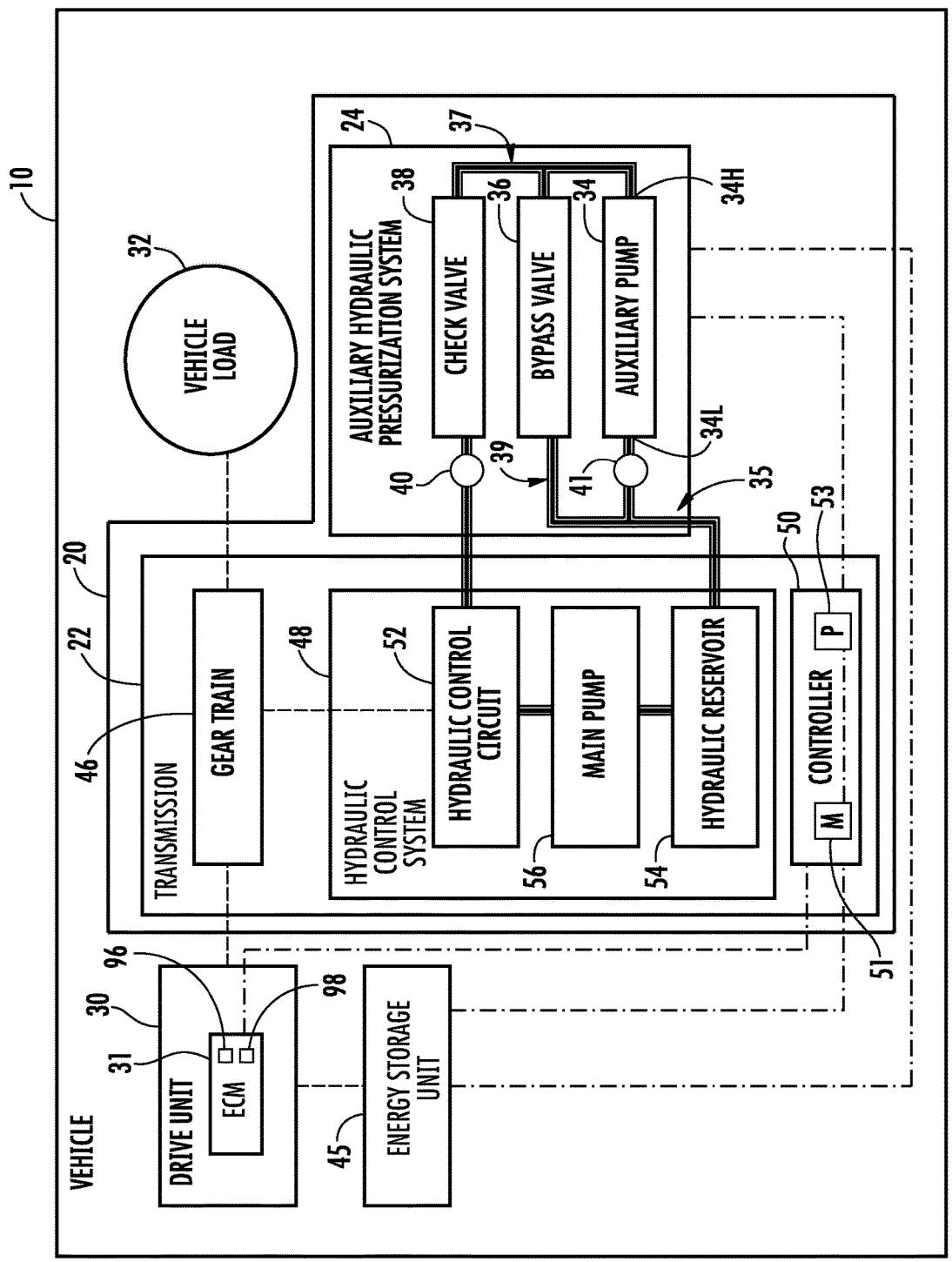
FIG. 2 is a diagrammatic view of a vehicle including a drive unit and the transmission unit of FIG. 1 showing that the drive unit and the transmission unit cooperate to drive a vehicle load.

Referring to FIGS. 1 and 2, in one embodiment, a transmission unit 20 adapted for use in a vehicle 10 includes a transmission 22 and an auxiliary hydraulic pressurization system 24 mounted to the transmission 22. The transmission 22 is configured to transmit torque from a drive unit 30 to drive a vehicle load 32 (see FIG. 2) while the drive unit 30 is on (or running). The auxiliary hydraulic pressurization system 24 is configured to maintain engagement of the transmission 22 between the drive unit 30 and the vehicle load 32 when the drive unit 30 is turned off (or shut down). Thus, freewheeling of the vehicle load 32 and movement of the vehicle 10 is resisted when the drive unit 30 is off and, as such, the drive unit 30 may be turned off when the vehicle 10 is making a short stop (such as a at red light) to thereby save fuel during a trip without the risk of vehicle roll.

The auxiliary hydraulic pressurization system 24 may be mounted to a transmission 22 as part of new transmission unit 20 construction or may be added to an existing transmission 22 to provide a retrofitted transmission unit 20 in the field as suggested in FIG. 1. The auxiliary hydraulic pressurization system 24 illustratively includes an auxiliary pump 34, a bypass valve 36, and a check valve 38 mounted to the transmission 22 as shown in FIG. 1. The auxiliary pump 34 is illustratively powered when the drive unit 30 is off. The bypass valve 36 is configured to prevent the auxiliary pump 34 from providing hydraulic fluid to the transmission 22 at a pressure greater than a threshold bypass pressure by bypassing any over-threshold flow from a high-pressure side 34H to a low pressure side 34L of the auxiliary pump 34. In the illustrative embodiment, the threshold bypass pressure is about 48 pounds per square inch (psi) but in other embodiments may be higher or lower depending on hydraulic fluid demand when the drive unit 30 is off and/or other criteria. The check valve 38 is arranged to block back flow from the transmission 22 through the bypass valve 36 and the auxiliary pump 34 to prevent damage to the auxiliary pump 34.

In the illustrative embodiment, the auxiliary hydraulic pressurization system 24 also includes an optional pressure sensor 40 and, in some embodiments, an optional filter 41 as shown in FIGS. 1 and 2. The pressure sensor 40 is configured to detect the pressure of hydraulic fluid provided to the transmission 22 by the auxiliary pump 34. The auxiliary pump 34 may be controlled during operation of the auxiliary hydraulic pressurization system 24 based in part on signals produced by the pressure sensor 40 as further described herein. The filter 41 is configured to clean fluid entering the auxiliary pump 34 from the reservoir 54. In some embodiments, the filter 41 is used in conjunction with an internal filter (not shown) included in the hydraulic control system 48.

The auxiliary pump 34 is illustratively an electrically driven pump with a pump element 42 and a motor 44 coupled to the pump element 42 a shown in FIG. 1. In one particular embodiment, for example, the auxiliary pump 34 is embodied as a twelve volt Model GP-612 electric gear pump, which is commercially available from http://www.enginegearonline.com. Of course, in other embodiments, the auxiliary pump 34 may be embodied as other types of pumps. For example, in some embodiments, the auxiliary pump 34 may be adapted to be driven by compressed air, pressurized oil, or another form of stored energy.

Turning to FIG. 2, in the illustrative embodiment, the vehicle 10 includes the transmission unit 20, the drive unit 30, and an energy storage unit 45. The transmission unit 20 is shown to include the transmission 22 and the auxiliary hydraulic pressurization system 24 coupled to the transmission 22. The drive unit 30 is illustratively an internal combustion engine including an engine control module (ECM) 31 configured to control the operation of the drive unit 30. The energy storage unit 45 is illustratively embodied as a vehicle battery. The energy storage unit 45 is electrically coupled to the drive unit 30 to be charged when the drive unit 30 is on and is electrically coupled to the auxiliary hydraulic pressurization system 24 to provide electrical energy to the auxiliary pump 34 when the drive unit 30 is off.

The transmission 22 illustratively includes a gear train 46, a hydraulic control system 48, and a controller 50 as shown diagrammatically in FIG. 2. The gear train 46 is reconfigurable among a plurality of gear ratios to transmit torque from the drive unit 30 to the vehicle load 32. The hydraulic control system 48 is configured to set the gear train 46 in one of the gear ratios as selected by the controller 50. The controller 50 is coupled to the engine control module 31, the hydraulic control system 48, and to the auxiliary hydraulic pressurization system 24 as shown in FIG. 2. The controller 50 is configured to select a gear ratio for the gear train 46 and to direct operation of the auxiliary hydraulic pressurization system 24 based, at least in part, on information from the engine control module 31.

The hydraulic control system 48 includes a hydraulic circuit 52, a hydraulic reservoir 54, and a main pump 56 as shown in FIG. 2. The hydraulic circuit 52 is configured to set the gear train 46 in one of the gear ratios as selected by the controller 50 by operating a plurality of valves to engage and disengage a plurality of clutches (shown in FIG. 3). The hydraulic reservoir 54 stores hydraulic fluid for use in the hydraulic circuit 52. The hydraulic reservoir 54 is coupled to the hydraulic circuit 52 through the main pump 56 to establish a main path for pressurized fluid to reach the hydraulic circuit 52. The hydraulic reservoir 54 is also coupled to the hydraulic circuit 52 through the auxiliary hydraulic pressurization system 24 to establish an auxiliary path for fluid provided to the hydraulic circuit 52. The main pump 56 is mechanically driven by the drive unit 30 to supply pressurized hydraulic fluid from the hydraulic reservoir 54 to the hydraulic circuit 52 when the drive unit 30 is on.

The controller 50 illustratively includes a memory 51 and a processor 53 coupled to the memory 51 and configured to perform instructions stored in the memory 51. In some embodiments, the controller 50 may be included in the auxiliary hydraulic pressurization system 24, included in the engine control module 31, or may be formed from a plurality of control circuits located throughout the vehicle 10.

Figure 3:
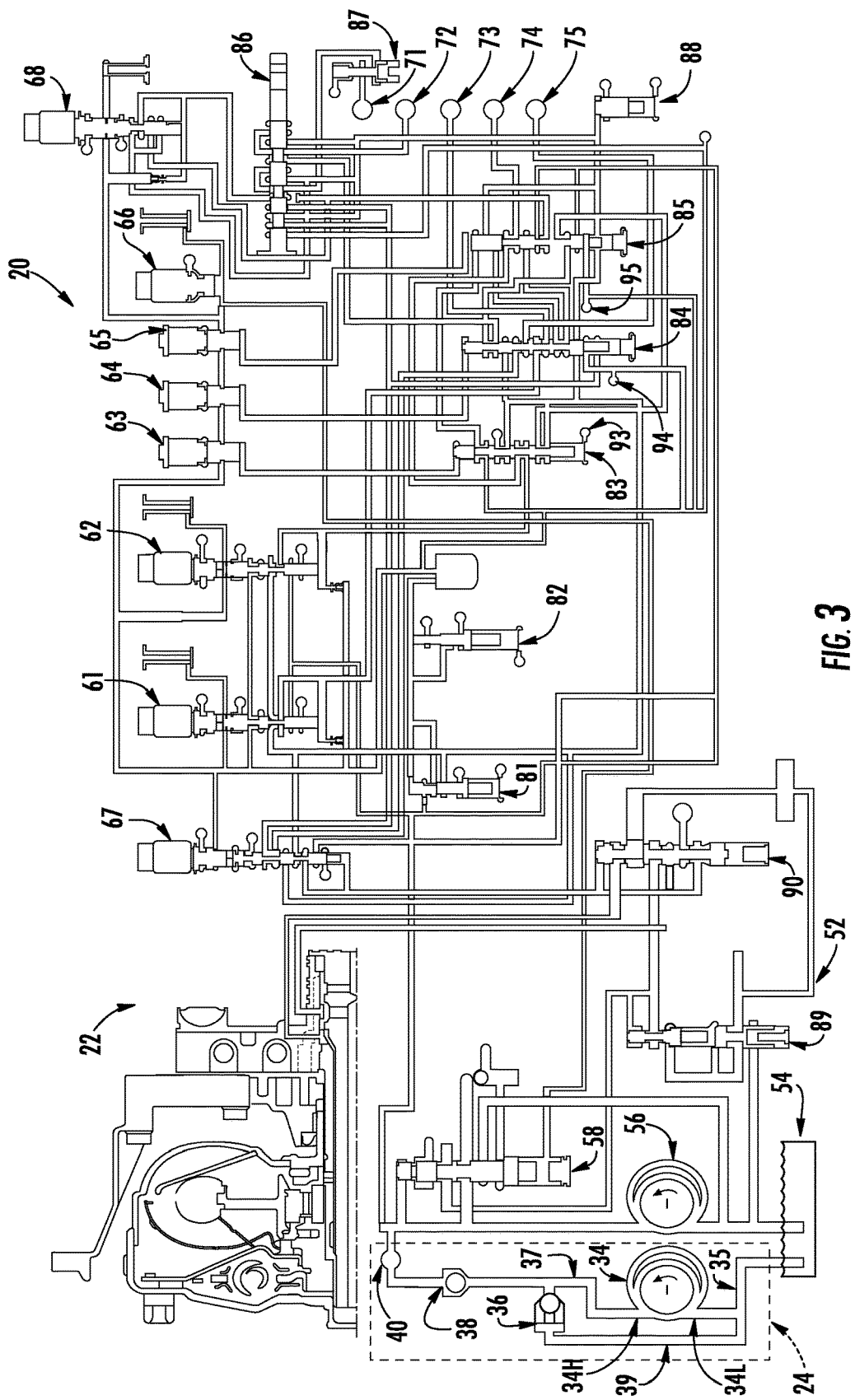
FIG. 3 is a detailed diagrammatic view of the transmission unit of FIG. 1 showing the auxiliary hydraulic pressurization system hydraulically coupled to the transmission around a main pump included in the transmission so that the auxiliary hydraulic pressurization system is configured to maintain hydraulic pressurization of the hydraulic control system when the main pump of the transmission is turned off, for example, when the drive unit is in an off state.

Referring now to FIG. 3, a detailed hydraulic diagram of the auxiliary hydraulic pressurization system 24 and the hydraulic control system 48 included in the transmission unit 20 is shown. As shown in FIG. 3, the auxiliary hydraulic pressurization system 24 is coupled to the hydraulic control system 48 by a low pressure line 35, a high pressure line 37, and a bypass line 39. In particular, the low pressure line 35 fluidly couples the hydraulic reservoir 54 of the hydraulic control system 48 to the low side 34L of the auxiliary pump 34. For example, in the illustrative embodiment of FIG. 1, the low pressure line 35 is plumbed into a dip stick port 55 of the transmission 22. The high pressure line 37 fluidly couples the high side 34H of the auxiliary pump 34 to the hydraulic circuit 52 of the hydraulic control system 48. Both the check valve 38 and the pressure sensor 40 are fluidly coupled in-line with, or otherwise to, the high pressure line 37. The bypass line 39 fluidly couples the low pressure line 35 to the high pressure line 37. The bypass valve 36 is fluidly coupled in-line with, or otherwise to, the bypass line 39 and cooperates therewith to establish a bypass path. The bypass path is typically closed, except for the condition in which an excessive pressure is developed in the high pressure line 37, which resultantly causes the bypass valve 36 to open.

As shown in FIG. 3, the hydraulic circuit 52 also includes an internal main pressure regulator 58 (also known as a line pressure regulator). The regulator 58 is illustratively configured to regulate flow through the regulator 58 below a regulation pressure. Excess flow above the regulation pressure is diverted by the regulator 58 from being used to set the hydraulic circuit 52 to one or more overflow components included in the hydraulic circuit 52 (e.g. to a conditioner, a cooler, and a loop included in the hydraulic circuit 52). The regulator 58 is fluidly coupled to the hydraulic reservoir 54, the main pump 56, and to the auxiliary hydraulic pressurization system 24 as also shown in FIG. 3. The regulator 58 is electrically coupled to the controller 50, and the controller 50 may operate the regulator 58 to set the regulation pressure.

In the illustrative embodiment, the controller 50 may adjust the regulation pressure of the regulator 58 to about 48 psi when the drive unit 30 is turned off when the vehicle 10 is at a stop, typically by lowering the regulation pressure from a greater value used during normal operation. In other embodiments, the controller 50 may adjust the regulator 58 to other regulation pressures. In some such embodiments, the regulator 58 may be used in place of the bypass valve 36 and, in such embodiments, bypass valve 36 may not be included the auxiliary hydraulic pressurization system 24. In other embodiments, the regulator 58 may be used in conjunction with the bypass valve 36 to control pressure in the hydraulic circuit 52.

As further shown in FIG. 3, the hydraulic circuit 52 also includes a plurality of solenoid valves 61, 62, 63, 64, 65, 66, 67, and 68, a plurality of clutches 71, 72, 73, 74, and 75, and a plurality of valves 81, 82, 83, 84, 85, 86, 87, 88, 89, 90. Those components of the hydraulic circuit 52 are arranged and configured to provide a number of reverse, neutral, and forward drive transmission ranges as is known in the art.

In the illustrative embodiment, the valves 83, 84, 85 of the hydraulic circuit 52 are embodied as logic valves that include switches 93, 94, 95 (respectively) situated in pressure bulbs associated with valves 83, 84, 85 as shown in FIG. 3. The switches 93, 94, 95 are configured to detect whether the pressure supplied to the valves 83, 84, 85 is at, or above, a hold threshold pressure. In the illustrative embodiment, the switches 93, 94, 95 are electrically coupled to the controller 50, and the controller 50 receives a signal from the switches 93, 94, 95 indicating if the valves 83, 84, 85 are being supplied with the hold threshold pressure (for example, about 25-30 psi). The controller 50 may be configured to turn on the drive unit 30 if the controller 50 determines that the auxiliary hydraulic pressurization system 24 fails to provide at least the hold threshold pressure to the valves 83, 84, 85 of the hydraulic circuit 52 while the drive unit 30 is off and the vehicle 10 is at a stop.

Figure 4:
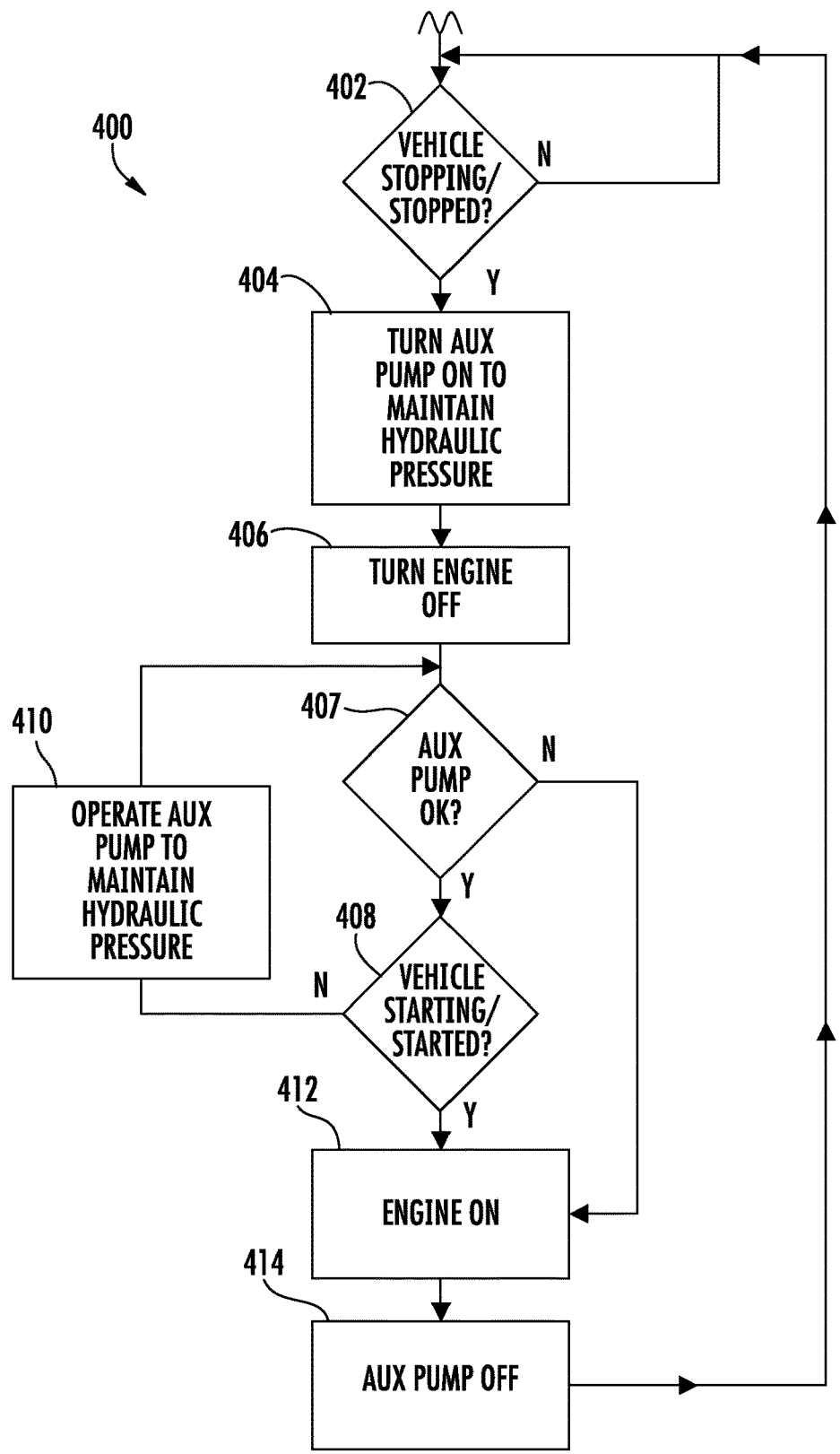
FIG. 4 is a simplified block diagram showing a method of operating the vehicle of FIG. 2.

Referring now to FIG. 4, in use, the controller 50 may execute a method 400 for operating the vehicle 10 to maintain the hydraulic pressure of the hydraulic control system 48 when the drive unit 30 of the vehicle 10 is in an off state (turned off). The method 400 may be embodied as, for example, a set of instructions stored in the memory 51 and executed by the controller 50. The method 400 begins with block 402 in which the controller 50 determines whether the vehicle 10 is in a stop condition (i.e., whether the vehicle 10 is stopped or in the process of stopping). To do so, in some embodiments, the controller 50 may receive a signal from a sensor 96 included in the ECM 31. In the illustrative embodiment, the signal from the sensor 91 is indicative of the velocity of the vehicle 10 based on drive unit 30 output RPM. The detected velocity signal is usable by the controller 50 to determine whether the vehicle is in a stop condition or may be directly indicative that the vehicle is in a stop condition (e.g., the velocity signal may indicate that the velocity of the vehicle 10 has dropped below a stopping/stopped velocity threshold). In other embodiments, the controller 50 may receive signals from one or more other sensors to determine if the vehicle 10 is in a stop condition. For example, signals indicative of vehicle acceleration/deceleration from accelerometers, signals indicative of user inputs such as from brake pedals, or other suitable signals may be used to determine if the vehicle 10 is in a stop condition. If the controller 50 determines that the vehicle 10 is not in a stopping condition, the method 400 loops back to block 402 to continue to monitor for a stopping condition.

If the controller 50 determines that the vehicle 10 is in a stop condition, the method 400 proceeds to a block 404 in which the controller 50 turns on the auxiliary pump 34. That is, if the controller 50 determines that the vehicle has come to a stop or is in the process of stopping, the auxiliary pump 34 is turned on and establishes a hold pressure in the hydraulic circuit 52. In the event that the hydraulic circuit 52 is still pressurized by the main pump 56 or by residual pressure in the circuit 52, flow from the auxiliary pump 34 may be passed through the bypass valve 36 until pressure in the circuit 52 drops below the threshold bypass pressure required to close the bypass valve 36. Additionally, should the controller 50 receive a signal from the pressure sensor 40 indicating that pressure in the high pressure line 37 is greater than a high sensor threshold, the controller 50 may be configured to turn off the auxiliary pump 34 until the signal from the pressure sensor 40 indicates that the pressure in the high pressure line 37 is below the high sensor threshold (and that the vehicle 10 is still in the stop condition).

After the auxiliary pump 34 has been turned on in block 404, the method 400 advances to block 406 in which the controller 50 causes the drive unit 30 (illustratively an engine) to be turned off. To do so, for example, the controller 50 may send a request signal to request that the ECM 31 turn off the drive unit 30. In some embodiments, the controller 50 may request a dwell time before the drive unit 30 is turned off. The dwell time may be configured allow the auxiliary pump 34 to develop the hold threshold pressure. In some embodiments, the controller 50 may operate the hydraulic circuit 52 during the dwell time before drive unit 30 is turned off so that one or more clutches are engaged to resist roll back. For example clutch 75 may be engaged during the dwell time so that the transmission 22 resists roll back in a manner similar to that described in U.S. Pat. No. 4,070,927, which is hereby incorporated by reference in its entirety, except in parts that contradict the present disclosure. In other embodiments, the controller 50 may operate the hydraulic circuit 52 to engage such clutches, or other clutches, after the drive unit 30 is turned off.

It should be appreciated that while the drive unit 30 is off, the main pump 56 mechanically driven by the drive unit 30 is also turned off and, as such, does not provide pressure to the hydraulic circuit 52. However, the auxiliary hydraulic pressurization system 24, via the auxiliary pump 34, maintains pressure in the hydraulic circuit 52 while the main pump 56 is off such that engagement of the transmission 22 between the drive unit 30 and the vehicle load 32 is maintained even when the drive unit 30 is turned off. It should be appreciated that without use of the auxiliary hydraulic pressurization system 24, hydraulic pressure in the hydraulic circuit 52 may drop in response to the main pump 56 being turned off due to systemic bleeds and leaks within the hydraulic circuit 52 culminating in disengagement of the drive unit 30 from the vehicle load 32.

After the drive unit has been turned off in block 406, the method 400 advances to block 407 in which the controller 50 determines whether the auxiliary hydraulic pressurization system 24 is operating properly. To do so, the controller 50 may determine whether the hydraulic pressurization system 24 is providing at least the hold threshold pressure to the hydraulic circuit 52. For example, in the illustrative embodiment, the controller 50 monitors signals received from the switches 93, 94, 95 included in the logic valves 83, 84, 85 to determine whether the hold threshold pressure is being supplied to the valves 83, 84, 85. In other embodiments, the controller 50 may determine the status of the auxiliary hydraulic pressurization system 24 based on other suitable signals. If the controller 50 determines that the auxiliary hydraulic pressurization system 24 is operating properly, the method 400 advances to block 408 in which a check is performed to determine whether the vehicle 10 is starting. If the controller 50 determines that the auxiliary hydraulic pressurization system 24 is not operating properly (e.g. the pressure supplied to the valves 83, 84, 85 of the hydraulic circuit is below the hold threshold pressure), the method 400 advances to block 412 to restart the drive unit 30 and thereby restore operation of the main pump 56 to pressurize the hydraulic circuit 52.

When the drive unit 30 is turned off and the vehicle 10 is at a stop in block 406, and the auxiliary hydraulic pressurization system 24 is determined to be operating properly in block 407, the method 400 proceeds to block 408 in which the controller 50 determines whether the vehicle 10 is starting or has started. To do so, the controller 50 may monitor one or more sensor signals indicative of a starting condition of the vehicle 10. For example, in the illustrative embodiment, the controller 50 receives a sensor signal from an accelerator sensor 98 included in the ECM 31, which indicates that the accelerator pedal has been being pressed by a user (providing a user request for movement). In other embodiments, the controller 50 may determine that the vehicle is starting or started as a function of brake signal received from the ECM 31, which indicates that a brake pedal has been released. Of course, the controller 50 may make such determination based on received signals such as signals indicative of changing velocity/acceleration or other suitable signals. If the controller 50 determines that the vehicle 10 is not starting or started, the method 400 advances to block 410 in which controller 50 continues to operate the auxiliary pump 34 to maintain pressure in the hydraulic circuit 52.

While maintaining pressure in the hydraulic circuit 52 in the block 410, the controller 50 may monitor the pressure in the high pressure line 37 and take appropriate action based thereon. For example, the illustrative controller 50 is configured to turn off the auxiliary pump 34 in response to a pressure signal from the sensor 40 indicating that the pressure in the high pressure line 37 has exceeded the high sensor threshold. In some embodiments, the controller 50 may also turn off the auxiliary pump 34 in response to a pressure signal from the sensor indicating that the pressure in the high pressure line 37 is below a low sensor threshold. In other embodiments, the controller 50 may be configured to toggle the auxiliary pump 34 on and off to maintain an engagement pressure in the hydraulic circuit 52 while minimizing the use of energy from the energy storage unit 45 while the vehicle 10 stopped.

Referring back to blocks 407 and 408, if the controller 50 determines that (i) the auxiliary hydraulic pressurization system 24 is not operating properly or (ii) the vehicle 10 is starting or started, the method 400 advances to block 412 in which the controller 50 causes the drive unit 30 (e.g., engine) to be returned to an on state (turned on). To do so, for example, the controller 50 may send a signal to the ECM 31 requesting that the drive unit 30 be turned on. When the drive unit 30 is turned back on, the main pump 56 is again mechanically driven to establish a run pressure in the hydraulic circuit 52. The run pressure produced by the main pump 56 is typically greater than the hold pressure produced by the auxiliary pump 34. However, in some embodiments, the run pressure may be equal to, or less than, the hold pressure.

After the drive unit 30 has been turned on in block 412, the method 400 advances to block 414 in which the controller 50 turns off the auxiliary pump 34 to reset the auxiliary hydraulic pressurization system 24 for future stops of the vehicle 10 and to allow energy storage unit 45 to be recharged. In some embodiments, the controller 50 wait for expiration of a dwell time before turning off the auxiliary pump 34 to allow the main pump 56 to develop normal operating pressures after the drive unit 30 is turned back on. Once the auxiliary pump 34 is off, the method 400 loops back to block 402 in which the controller 50 again determines whether the vehicle 10 is in a stop condition (i.e., is stopping or stopped).

In some embodiments, the controller 50 may be further configured to determine whether the energy storage unit 45 has a sufficient charge to operate the auxiliary pump 34 while the drive unit 30 is shut down during a stop. If the controller 50 determines that the energy storage unit 45 is not sufficiently charged, the controller 50 may operate the solenoid 68, the valve 86, and various other components of the transmission unit 20 to reduce the engine load required to maintain the condition of the transmission unit 20 during the stop with the drive unit 30 still on as described, for example, in U.S. Pat. No. 7,338,407 REDUCED ENGINE LOAD AT STOP APPARATUS AND METHOD to Long et al. U.S. Pat. No. 7,338,407, which is hereby incorporated by reference, in its entirety, except in parts that contradict the present disclosure.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. An auxiliary hydraulic pressurization system for use with a vehicle including a transmission having a hydraulic reservoir, a hydraulic circuit, and a main pump, the auxiliary hydraulic pressurization system comprising:
   an auxiliary pump with a low side adapted to be coupled to the hydraulic reservoir and a high side adapted to be coupled to the hydraulic circuit;
   a controller electrically connectable to the auxiliary pump and configured to turn on the auxiliary pump in response to receipt of a signal indicating that the vehicle is in a stop condition to maintain hydraulic pressurization of the hydraulic circuit of the transmission when the vehicle is in the stop condition, and
   a bypass valve coupled to the high side of the auxiliary pump and adapted to be coupled to the hydraulic circuit, wherein the bypass valve is biased to a closed position and is configured to open to an open position in response to a pressure of a fluid from the high side of the auxiliary pump matching a threshold bypass pressure,
   wherein the bypass valve remains in the open position while the pressure of the fluid is greater than the threshold bypass pressure to prevent the auxiliary pump from providing hydraulic fluid to the transmission at a pressure greater than the threshold bypass pressure and wherein the bypass valve is coupled to the hydraulic reservoir to establish a bypass path that transmits fluid from the auxiliary pump to the hydraulic reservoir when fluid moves from the auxiliary pump toward the hydraulic circuit at the pressure greater than the threshold bypass pressure, and
   a check valve coupled to the high side of the auxiliary pump and adapted to be coupled to the hydraulic circuit, the check valve configured to block backflow from the hydraulic circuit through the high side of the auxiliary pump.

2. The auxiliary hydraulic pressurization system of claim 1, wherein the threshold bypass pressure is about 45 psi.

3. The auxiliary hydraulic pressurization system of claim 1, further comprising a pressure sensor coupled to the controller and configured to detect fluid pressure between the high side of the auxiliary pump and the hydraulic circuit.

4. The auxiliary hydraulic pressurization system of claim 3, wherein the controller is configured to turn the auxiliary pump off in response to the pressure sensor detecting fluid pressure above a high reference threshold and to turn the auxiliary pump on in response to the pressure sensor detecting fluid pressure below a low reference threshold.

\* \* \* \* \*